(12) United States Patent
Ribak et al.

(10) Patent No.: US 7,328,241 B2
(45) Date of Patent: Feb. 5, 2008

(54) DYNAMIC VISUALIZATION OF ELECTRONIC MAIL PROPAGATION

(75) Inventors: Amnon Ribak, Misgav (IL); Sigalit Ur, D.N. Misgav (IL); Michal Jacovi, Rakefet (IL)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/035,423

(22) Filed: Jan. 4, 2002

(65) Prior Publication Data

US 2003/0163530 A1   Aug. 28, 2003

(51) Int. Cl.
*G06F 15/16* (2006.01)

(52) U.S. Cl. ..................................... 709/204
(58) Field of Classification Search ........ 709/204–224; 715/853, 752
See application file for complete search history.

(56) References Cited

U.S. PATENT DOCUMENTS

| | | | |
|---|---|---|---|
| 5,544,360 A | | 8/1996 | Lewak et al. |
| 5,857,077 A | * | 1/1999 | Nakagaki et al. ............ 709/238 |
| 5,948,058 A | | 9/1999 | Kudoh et al. |
| 6,076,101 A | * | 6/2000 | Kamakura et al. .......... 709/206 |
| 6,147,687 A | * | 11/2000 | Wanderski ................. 715/853 |
| 6,256,664 B1 | * | 7/2001 | Donoho et al. ............. 709/204 |
| 6,415,297 B1 | * | 7/2002 | Leymann et al. ........... 707/201 |
| 6,463,462 B1 | * | 10/2002 | Smith et al. ................ 709/206 |
| 6,789,107 B1 | * | 9/2004 | Bates et al. ................ 709/206 |
| 6,823,368 B1 | * | 11/2004 | Ullmann et al. ............ 709/206 |
| 6,832,244 B1 | * | 12/2004 | Raghunandan .............. 709/206 |
| 2002/0016928 A1 | * | 2/2002 | Takaragi et al. ............ 713/201 |
| 2002/0087679 A1 | * | 7/2002 | Pulley et al. ............... 709/224 |
| 2002/0099777 A1 | * | 7/2002 | Gupta et al. ................ 709/206 |
| 2002/0129106 A1 | * | 9/2002 | Gutfreund ................... 709/205 |
| 2003/0167310 A1 | * | 9/2003 | Moody et al. .............. 709/206 |

OTHER PUBLICATIONS

Gulcu et al., Mixing E-Mail with Babel, Network and Distributed System Security, 1996., Proceedings of the Symposium, Feb. 22-23, 1996, pp. 2-16.*

* cited by examiner

*Primary Examiner*—Jason Cardone
*Assistant Examiner*—Thomas Duong
(74) *Attorney, Agent, or Firm*—Browdy and Neimark, PLLC

(57) ABSTRACT

A method is described for providing information regarding a piece of electronic mail (e-mail). The method includes processing a data set containing transmission data associated with the e-mail so as to determine one or more steps in a propagation history of the e-mail. The transmission data typically include identifiers of a sender of the e-mail and of one or more recipients of at least a portion of the e-mail. The method also includes displaying the propagation history. Preferably, processing the data set includes analyzing transmission information embedded in text of the e-mail.

54 Claims, 6 Drawing Sheets

DYNAMIC VISUALIZATION OF ELECTRONIC MAIL PROPAGATION

FIELD OF THE INVENTION

The present invention relates generally to electronic mail, and specifically to methods and apparatus for visualizing electronic mail.

BACKGROUND OF THE INVENTION

Communication between two or more users employing electronic mail (e-mail) over a public network, such as the "World Wide Web" or a local-area network (LAN) is well known. A piece of e-mail typically includes a short message or piece of text, and, optionally, one or more larger files attached to the e-mail. Frequently, a user sends a copy of an e-mail both to one or more primary recipients (specified in the "To:" field) and to other secondary, or "carbon copy" recipients (specified in the "cc:" field). Recipients of the e-mail typically see a list naming each of the other direct and carbon-copy recipients of the e-mail. A piece of e-mail which is forwarded and cc'd a number of times before reaching a recipient typically includes the entire propagation history of the e-mail, starting from its original sender, unless this history is deliberately deleted by a user at some point in the propagation of the e-mail.

Systems which parse electronic mail in order to differentiate between the different fields are known. U.S. Pat. No. 5,948,058 to Kudoh et al., which is incorporated herein by reference, describes a method and apparatus for cataloging and retrieving e-mail. Header information and a defined class of every e-mail are displayed simultaneously so as to enable a user's e-mails to be categorized more efficiently. Each category may have its own symbol or icon to enable simple visual categorization.

U.S. Pat. No. 5,544,360 to Lewak et al., which is incorporated herein by reference, describes a computer filing system for accessing computer files and data according to user-designated criteria.

SUMMARY OF THE INVENTION

In preferred embodiments of the present invention, an e-mail processing program runs on a user's computer, and processes e-mail header information in pieces of electronic mail received by the user. The program preferably provides an on-screen, graphical display containing information regarding each piece of electronic mail. Typically, the information is indicative of the propagation history of the e-mail, e.g., identifying the sender of the e-mail, one or more of its recipients, and, if appropriate, their locations in a corporate or other hierarchy. The information is preferably displayed in a user-friendly way, enabling the user to quickly ascertain geographical, hierarchical, or other information pertinent to any of the correspondents who sent or received any portion of the e-mail.

An advantage, therefore, of some aspects of the present invention, is the ability to provide apparatus and methods for improving the organization of electronic mail data.

A further advantage of some aspects of the present invention is the ability to provide improved apparatus and methods for displaying electronic mail data.

In a preferred embodiment of the present invention, the user's computer provides a graphical display of the organizational hierarchy (e.g., a tree), and superimposes on the hierarchy a series of markers indicative of the propagation history of the e-mail. This display typically enables the user to understand the relative importance of the senders and recipients at each stage in the e-mail's propagation. Thus, for example, the user would be able to quickly see that a given piece of e-mail was sent back and forth among several junior engineers in a particular office, then bounced to a senior engineer, who immediately forwarded it to the CEO, who, in turn, forwarded the mail with added comments to all division chiefs, one of whom ultimately sent the e-mail with no further comment to the user.

By contrast to these embodiments of the present invention, prior art e-mail systems typically display an e-mail in reverse chronological order, with the most recent correspondence displayed at the top. The current state-of-the-art in electronic mail display does not normally enable the user to assess what position in an established hierarchy is held by any of the senders, primary recipients, or secondary recipients. Similarly, the prior art does not readily enable a user to determine what level of authority is attached to any particular part of the e-mail. In summary, knowledge about organizational structure is typically unavailable to prior art e-mail systems, so no such automated analysis of the header information is possible. An attempt to extract this information manually, e.g., by reading the e-mail note and continually referring to an organizational chart, would typically be a long and tedious task.

In a preferred embodiment, the user's computer is enabled to incorporate in the displayed hierarchy a marker indicating a person mentioned in the e-mail who is not necessarily included in the transmission chain of the e-mail. Thus, for example, the user may right-click on the name of a person in the middle of a paragraph in the e-mail, and the computer will mark that name in red on the hierarchy displayed on the user's screen.

It will be appreciated that, by way of illustration and not limitation, the propagation history is generally described herein for display with respect to an organizational hierarchy. Alternatively or additionally, the history may be displayed with respect to other data available to the user's computer, such as, for example, telephone area codes, a map, or the name of each recipient's employer. Further alternatively or additionally, the information may be displayed without any prior knowledge of relationships among the senders and recipients. In this case, each name is preferably displayed at an arbitrarily-selected location on the user's screen, and arrows or other markers are used to show the propagation of the e-mail.

There is therefore provided, in accordance with a preferred embodiment of the present invention, a method for providing information regarding a piece of electronic mail (e-mail), including:

processing a data set containing transmission data associated with the e-mail so as to determine one or more steps in a propagation history of the e-mail, the transmission data including identifiers of a sender of the e-mail and of one or more recipients of at least a portion of the e-mail; and displaying the propagation history.

Preferably, processing the data set includes analyzing transmission information embedded in text of the e-mail. Alternatively or additionally, processing the data set includes analyzing transmission information not contained in text of the e-mail.

In a preferred embodiment, displaying the propagation history includes designating a first visual symbol to represent transmission of the e-mail to a primary recipient, and designating a second visual symbol different from the first visual symbol to represent transmission of the e-mail to a secondary recipient.

Alternatively or additionally, displaying the propagation history includes designating a first visual symbol to represent the sender and designating at least one visual symbol different from the first visual symbol to represent the one or more recipients. For example, displaying the propagation history may include designating a first color for the first visual symbol and designating a second color, different from the first color, for the at least one visual symbol.

For some applications, displaying the propagation history includes graphically displaying the propagation history, e.g., graphically displaying the steps in the history in an animation mode.

Typically, graphically displaying the propagation history includes:

displaying a representation of the sender and at least one of the recipients; and displaying a graphical representation of movement of the e-mail from the sender to the at least one of the recipients.

For example, displaying the graphical representation of movement may include displaying an arrow.

In accordance with a preferred embodiment of the present invention, processing the data set includes determining two or more steps in the propagation history of the e-mail, the transmission data including for each step in the propagation history identifiers of a sender and one or more recipients of a respective portion of the piece of e-mail, and the method includes:

receiving from a user a designation of an electronic mail correspondent;

finding at least one identifier in the transmission data corresponding to the designated correspondent; and displaying part of the piece of e-mail responsive to finding the at least one identifier.

Displaying part of the piece of e-mail may include, for example, displaying e-mail content sent by the correspondent. Alternatively or additionally, displaying part of the piece of e-mail may include displaying e-mail content sent to the correspondent.

In a preferred application, the method includes:

determining a location of the correspondent in a hierarchy;

displaying the hierarchy; and identifying for the user the location of the correspondent in the hierarchy.

Preferably, the method includes receiving information regarding a relationship relating members in a set, which set includes at least some of: the sender and the one or more recipients, wherein displaying the propagation history includes displaying the propagation history responsive to the relationship. For example, receiving the information may include receiving geographical and/or hierarchical information about the members. Receiving hierarchical information typically includes receiving for each one of a plurality of the members, information indicating: (a) who reports to that member and (b) to whom does that member report.

Displaying the propagation history typically includes:

displaying a hierarchy including the members in the set; and displaying the propagation history with respect to the hierarchy.

In a preferred embodiment, displaying the propagation history with respect to the hierarchy includes superimposing a representation of the propagation history on the hierarchy.

There is also provided, in accordance with a preferred embodiment of the present invention, a method for providing information regarding a piece of electronic mail (e-mail), including:

scanning the e-mail so as to identify a sender or recipient of at least a portion of the e-mail;

displaying a hierarchy; and indicating on the hierarchy a location of the sender or recipient in the hierarchy.

There is further provided, in accordance with a preferred embodiment of the present invention, apparatus for providing information regarding a piece of electronic mail (e-mail), including:

a processor, configured to process a data set containing transmission data associated with the e-mail so as to determine one or more steps in a propagation history of the e-mail, the transmission data including identifiers of a sender of the e-mail and of one or more recipients of at least a portion of the e-mail; and a display, configured to display the propagation history.

There is still further provided, in accordance with a preferred embodiment of the present invention, apparatus for providing information regarding a piece of electronic mail (e-mail), including:

a display; and a processor, configured to scan the e-mail so as to identify a sender or recipient of at least a portion of the e-mail, configured to drive the display to display a hierarchy, and configured to drive the display to indicate on the hierarchy a location of the sender or recipient therein.

There is yet further provided, in accordance with a preferred embodiment of the present invention, a computer program product for providing information regarding a piece of electronic mail (e-mail), the product including a computer-readable medium having program instructions embodied therein, which instructions, when read by a computer, cause the computer to:

process a data set containing transmission data associated with the e-mail so as to determine one or more steps in a propagation history of the e-mail, the transmission data including identifiers of a sender of the e-mail and of one or more recipients of at least a portion of the e-mail; and display the propagation history.

There is additionally provided, in accordance with a preferred embodiment of the present invention, a computer program product for providing information regarding a piece of electronic mail (e-mail), the product including a computer-readable medium having program instructions embodied therein, which instructions, when read by a computer, cause the computer to:

scan the e-mail so as to identify a sender or recipient of at least a portion of the e-mail;

display a hierarchy; and indicate on the hierarchy a location of the sender or recipient in the hierarchy.

The present invention will be more fully understood from the following detailed description of the preferred embodiments thereof, taken together with the drawings, in which:

DETAILED DESCRIPTION OF PREFERRED EMBODIMENTS

Figure 1:
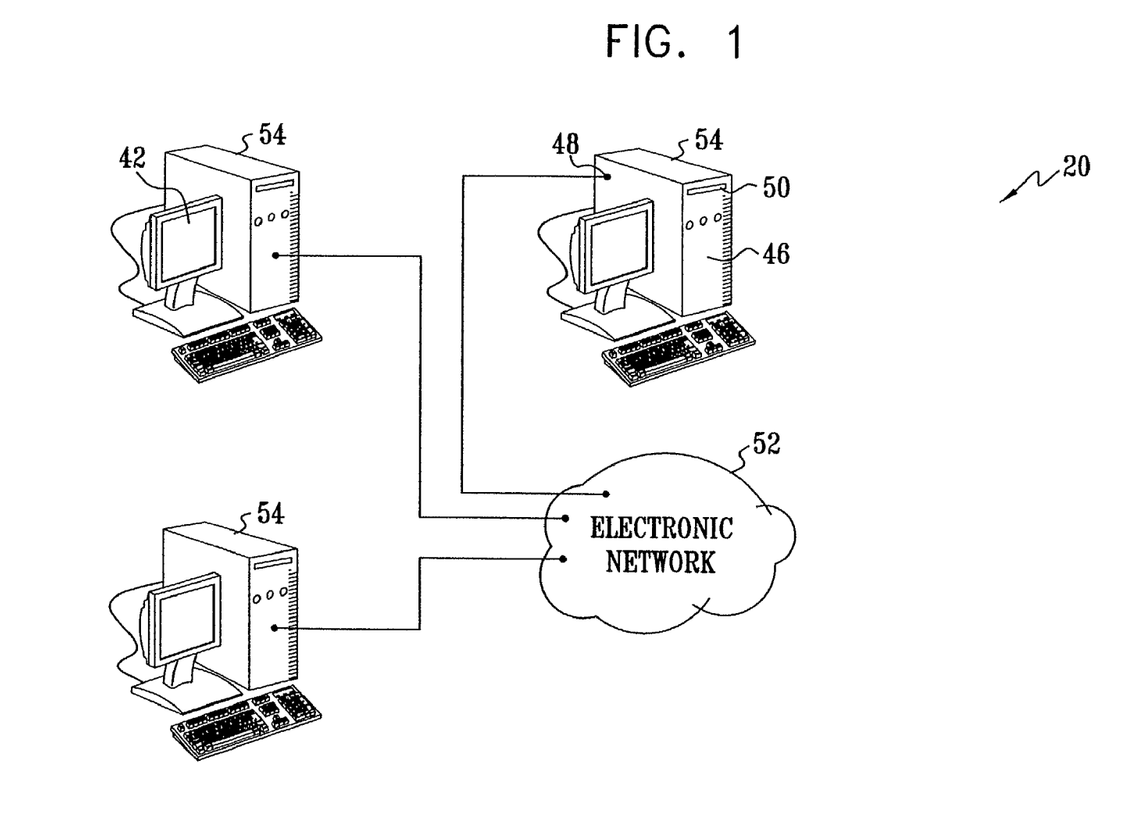
FIG. 1 is a simplified pictorial illustration showing a system for visualization of e-mail data, in accordance with a preferred embodiment of the present invention.

FIG. 1 is a simplified pictorial illustration showing a system 20 for visualization of the propagation of e-mail data, in accordance with a preferred embodiment of the present invention. In a typical application, a user of a first computer 54 is enabled to see the one or more steps in the propagation history of a piece of e-mail which was sent over an electronic network 52, and read, edited, forwarded, and/or "carbon-copied" (cc'd) by users of one or more other computers 54 coupled to the network. Typically, the propagation history is extracted by the user's computer, at least in part, from header information embedded in the body of the e-mail.

The various components of system 20 are preferably constructed generally in accordance with standards known in the art, comprising hardware such as a processor 46, a data port 48, a monitor 42, and a memory 50, which are configured to allow the processing of electronic mail. Electronic network 52 typically comprises the Internet, but may, alternatively or additionally, include other electronic networks known in the art.

Figure 2:
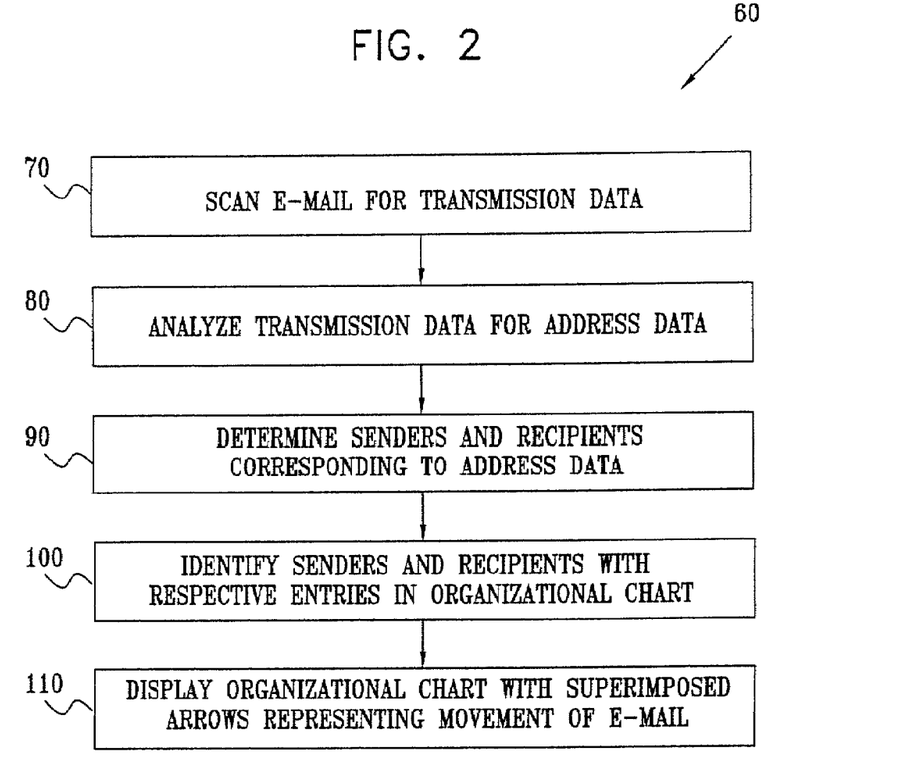
FIG. 2 is a flow chart showing a method for matching e-mail data with organizational data, in accordance with a preferred embodiment of the present invention.

FIG. 2 is a simplified flowchart 60 showing a method for matching e-mail data with organizational data, in accordance with a preferred embodiment of the present invention. In a scan step 70, computer 54 preferably scans a received e-mail for transmission data, and subsequently analyzes the transmission data to determine address data in an analyze step 80. In a determine step 90, computer 54 preferably determines the identities of the various senders and recipients based on the address data. For example, the received e-mail may include the following text:

From: 'Sharon'
To: 'Doug'
cc: 'Michael', 'Marilyn', 'Lynne', tim@littleserver.com'
Date: Tuesday, Nov. 10, 1998 11:22 AM
Subject: RE: RE: 1998 sales report
   Okay, everybody. Doug responded by e-mail, and everyone else called me. Let's meet on Friday morning at 8:20.
--Sharon
>-----Original Message-----
>From: 'Doug'
>Sent: Monday, Nov. 09, 1998 11:08 AM
>To: 'Sharon', 'Michael'
>Subject: Re: 1998 sales report
>I think it's a good idea. Michael?? Any ideas?
>Regards, --Doug
>-----Original Message----
>From: 'Sharon'
>To: 'Doug'
>cc: 'Marilyn', 'Lynne', 'tim@littleserver.com'
>Date: Sunday, Nov. 08, 1998 4:11 PM
>Subject: 1998 sales report
>Who thinks we should meet to discuss the upcoming report?
>--Sharon In this example, computer 54 scans the address data in the e-mail above and determines that, in the first phase of the e-mail's propagation, 'Sharon' is a sender, 'Doug' is a primary recipient, and 'Marilyn,' 'Lynne,' and 'tim@littleserver.com' are secondary recipients. Continued analysis preferably generates the entire propagation history of the e-mail. Computer 54 (or another computer) then searches in an organizational chart for the aforementioned names, and, if matches are found, the computer displays the chart with appropriate visual symbols, typically indicating sender, primary recipients, and secondary recipients, in a display step 110. As appropriate, the visual symbols may be distinguished by color, size, font, style, and/or the use of graphical objects, such as arrows, in order to more clearly indicate the propagation of the piece of e-mail. If some of the names are not found in the organizational chart, then they may be displayed with a symbol or color indicating "no further information known." Optionally, people on the chart with whom the user has previously corresponded may be marked in a particular color.

In a preferred embodiment, computer 54 displays an animation sequence in step 110, in which appropriately colored arrows or other markers are superimposed on the chart, so as to represent the movement of the e-mail. Typically, the hierarchical chart is generated based on a representation of the organization's structure, e.g., Beth, John, and Mary report to Steven, Steven reports to Andre, and Andre reports to Charles, the head of the organization.

Figure 3A:
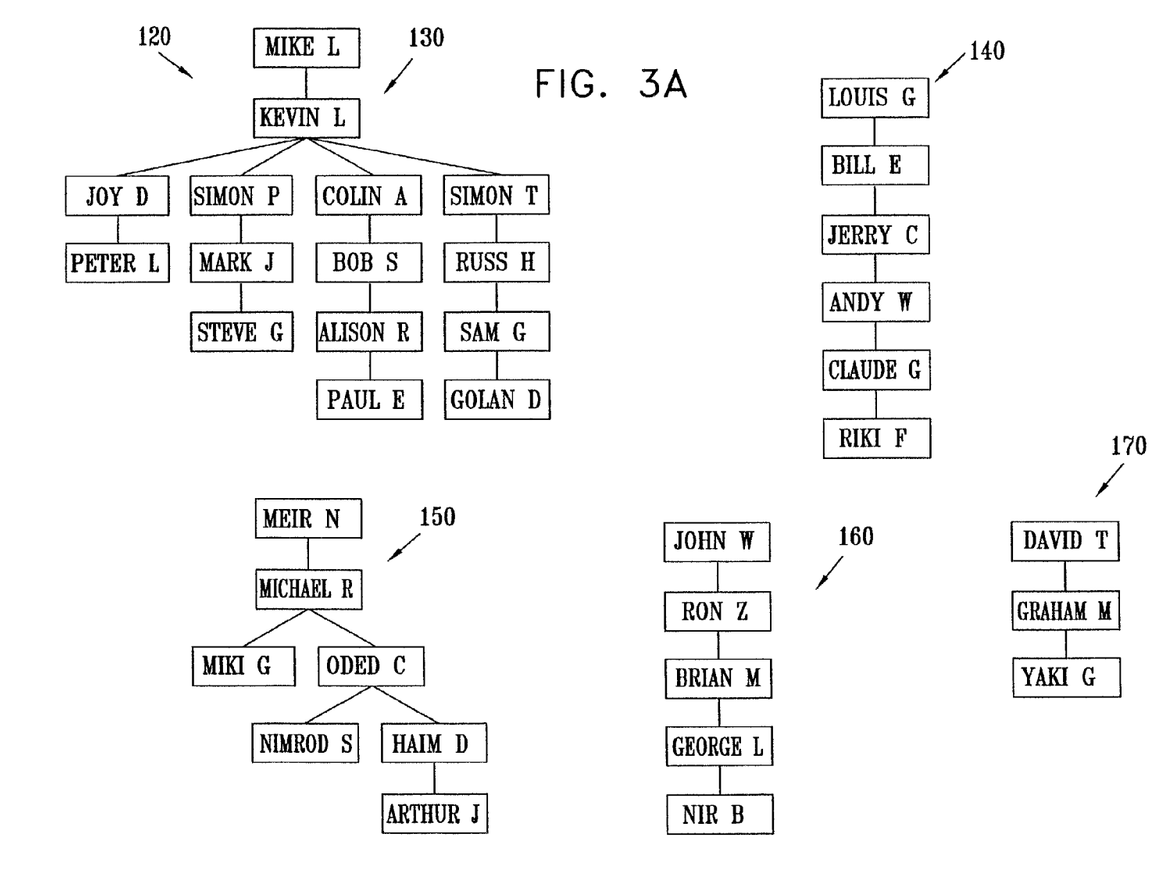
FIGS. 3A, 3B, and 3C are charts showing the propagation of e-mail through an organization, generated in accordance with a preferred embodiment of the present invention.

FIG. 3A is a sample chart 120 showing members of a company, the chart being configured for display on monitor 42 of computer 54, in accordance with a preferred embodiment of the present invention. Although chart 120 is shown in the figure as displaying an organizational hierarchy, it will be appreciated that other themes (e.g., a map) may be appropriate for other applications. In sample chart 120, a plurality of hierarchical trees 130, 140, 150, 160, and 170, are shown, each representing the authority of employees of the company in five of its offices. As described hereinabove, chart 120 may be obtained from an already existing database, or, alternatively, generated by computer 54 based on analysis of a company telephone directory, payroll register, or other list of employees which includes information relevant to the user. Preferably, computer 54 is enabled to display chart 120 in a variety of different formats (e.g., Tree View, Directory View, Fish-Eye). Alternatively or additionally, the names are shown in a non-hierarchical fashion, e.g., in clusters of names, each cluster having a particular characteristic such as employer, salary range, or nationality. For some applications, the names are displayed on monitor 42 without being arranged with respect to an external organizing characteristic.

Figure 3B:
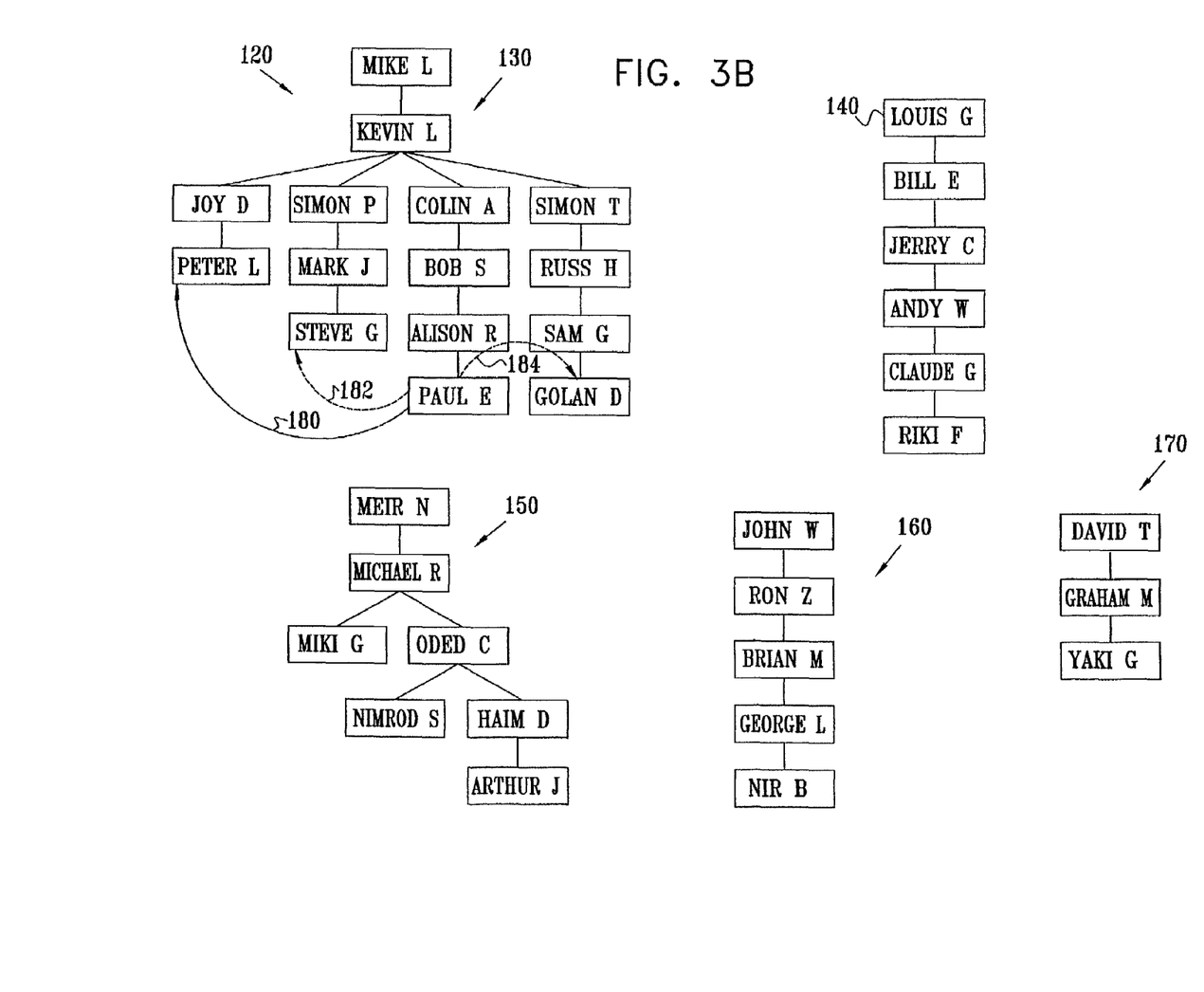

FIG. 3B shows chart 120, and, superimposed thereon, the first stage of propagation of a piece of e-mail, in accordance with a preferred embodiment of the present invention. In this example, arrows 180, 182 and 184 represent the sending of an e-mail from a sender (Paul Earnest) to three respective recipients (Peter Lawrence, Steve Goddard, and Golan Duvnov). Preferably, arrows leading to primary recipients of the e-mail (i.e., Peter Lawrence) are unbroken, while arrows leading to secondary recipients are dashed. Alternatively or additionally, the names of senders and recipients are highlighted in another suitable fashion, so as to enable the user to easily identify the flow of the e-mail on a large organizational chart. For example, the sender may be marked with a red square, and each receiver may be marked with a blue square.

Advantageously, by displaying senders and recipients in a manner which indicates their ranks within the organization, the user can quickly assess the importance of any name appearing in an e-mail. Thus, in the example shown in FIG. 3B, the fact that the e-mail was sent to no recipient with a rank higher than that of middle-level manager Peter Lawrence might be of great importance to the user. By contrast, prior art e-mail displays, which show a linear and sometimes very long "cc" list, typically make it extremely difficult for the recipient of an e-mail to quickly grasp the ranks and/or office locations of individuals within the company who have read the e-mail.

Figure 3C:
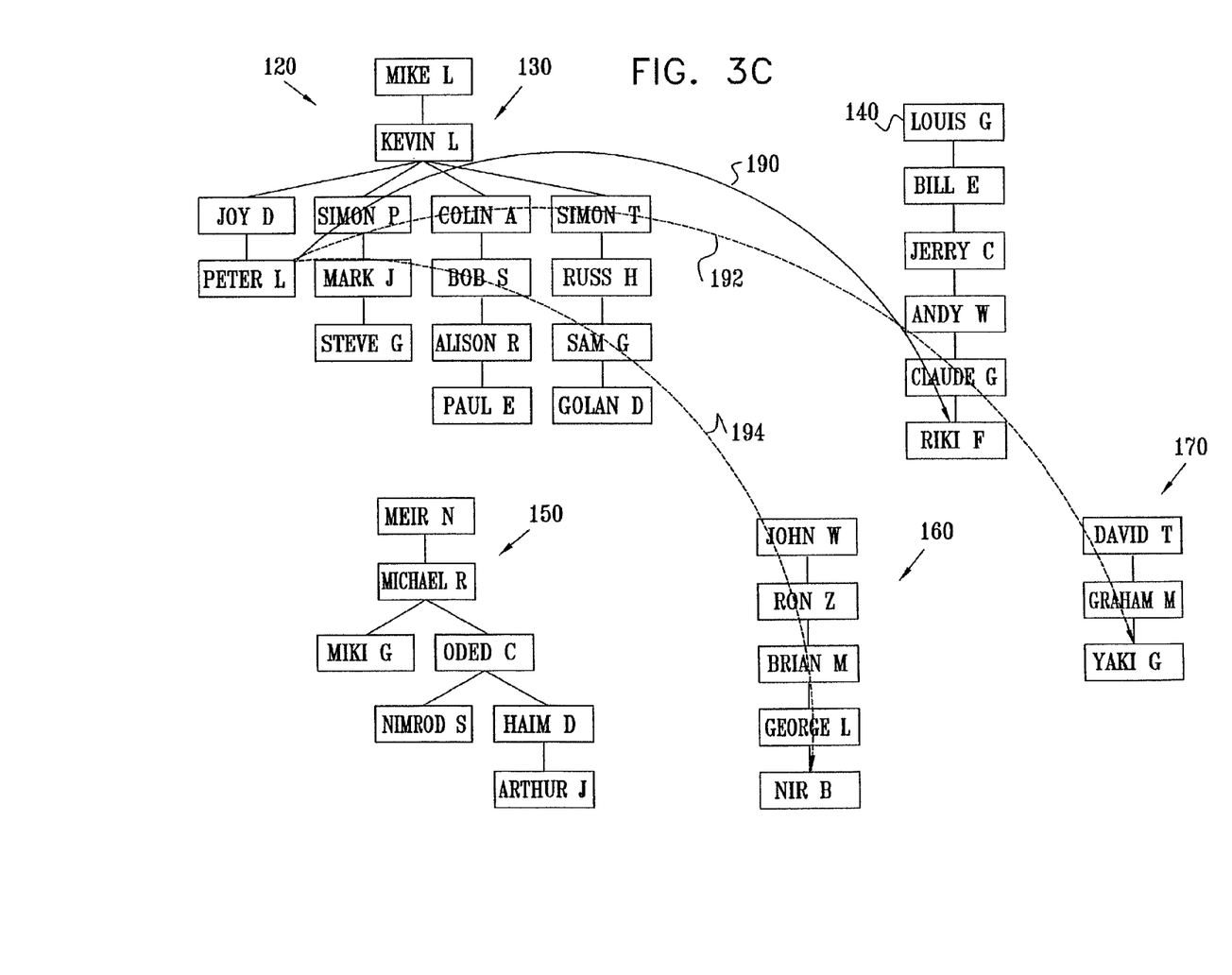

FIG. 3C shows chart 120, and, superimposed thereon, the second stage of propagation of the piece of e-mail whose first stage of propagation is shown in FIG. 3B, in accordance with a preferred embodiment of the present invention. In this second stage of the e-mail, arrows 190, 192 and 194 represent the sending of the e-mail from Peter Lawrence (shown as a recipient in FIG. 3B), to a primary recipient (Riki Fontaine) and to two secondary recipients (Yaki Goldberg and Nir Ben-Zvi).

Figure 4:
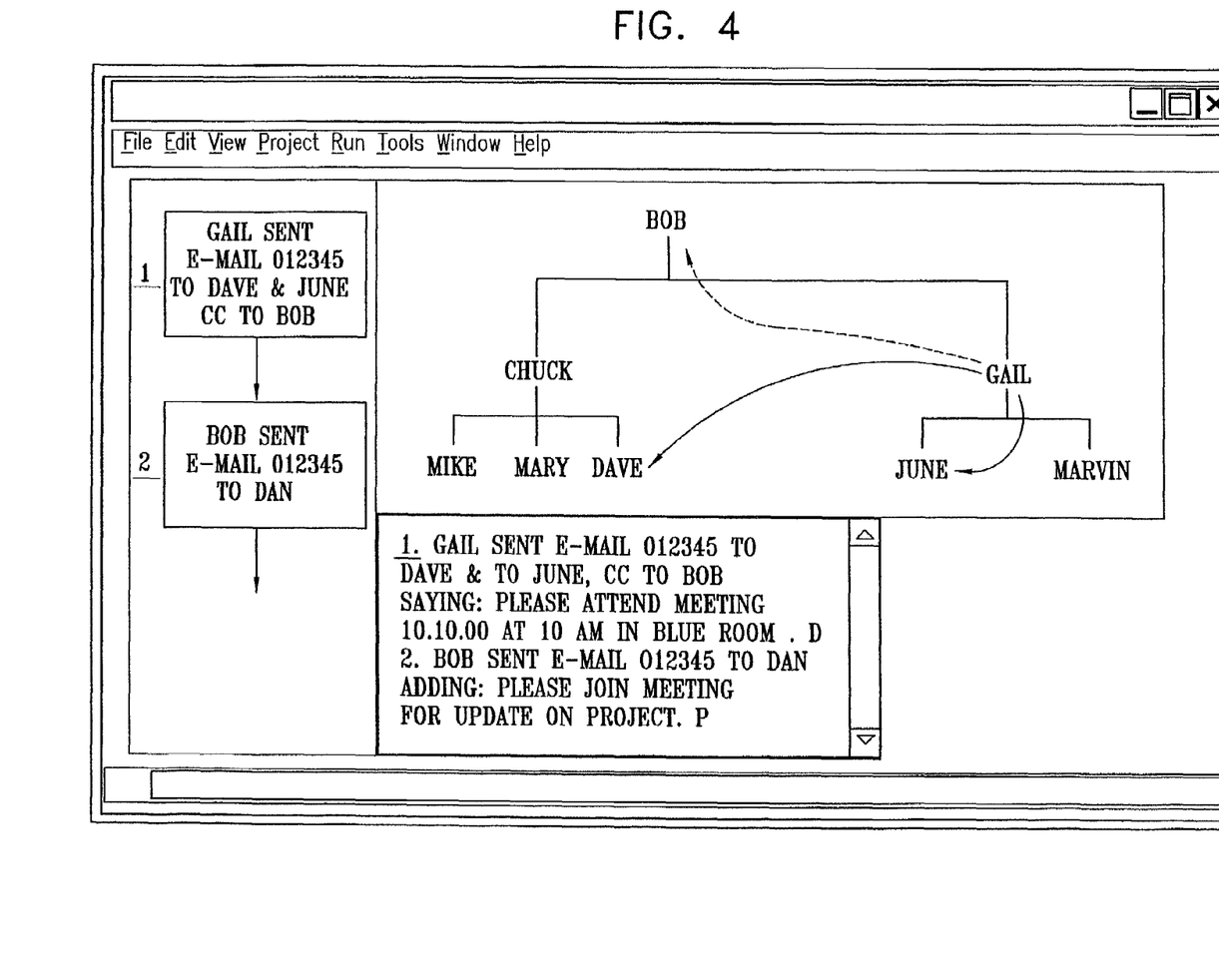
FIG. 4 is a schematic illustration of a computer screen displaying e-mail propagation data in conjunction with an organizational chart, in accordance with a preferred embodiment of the present invention.

FIG. 4 is a sample display showing an output of computer 54 in response to processing a received e-mail, in accordance with a preferred embodiment of the present invention. Preferably, a graphical user interface (GUI) operating on computer 54 receives a mouse input from the user indicating one of the names on a displayed hierarchy, and computer 54 graphically and textually displays the interactions of that person with the received e-mail. For example, if the user clicks on "Gail" in the hierarchy, then computer 54 preferably highlights boxes on the left side of the screen indicating phases in the e-mail's history in which Gail played a role as sender or recipient. Moreover, the text of each of these phases is preferably highlighted in a text-display box at the bottom of the screen.

Alternatively or additionally, the user is enabled to scroll through the text of the e-mail displayed in the text-display box, and propagating arrows on the chart are displayed and updated in accordance with the sender and recipients of any given displayed portion of the e-mail.

Further alternatively or additionally, system 20 provides information to the user concerning a person mentioned in the text of the e-mail itself, but who happens not to be a sender or recipient at any phase in the e-mail's history. Thus, for example, the user may click on the name "Elizabeth Rose" in the middle of a sentence in the e-mail, and computer 54 highlights that name on the organizational chart.

Preferably, some or all of the features described herein with respect to system 20 are incorporated in plug-ins designed to operate with existing electronic mail software, such as, by way of illustration and not limitation, Lotus Notes, Microsoft Outlook, cc:Mail, Commtouch, Pronto-Mail, Yahoo! Mail, or Eudora. Alternatively or additionally, dedicated stand-alone e-mail software operating on one or more computers in system 20 performs some or all of the processing and displaying functions described herein.

It will be understood by one skilled in the art that aspects of the present invention described hereinabove can be embodied in a computer running software, and that the software can be supplied and stored in tangible media, e.g., hard disks, floppy disks or compact disks, or in intangible media, e.g., in an electronic memory, or on a network such as the Internet.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for providing information regarding a piece of electronic mail (e-mail), comprising:
    processing a data set containing transmission data associated with the e-mail so as to determine one or more steps in a propagation history of the e-mail, the transmission data including identifiers of a sender of the e-mail and of one or more recipients of at least a portion of the e-mail; and
    graphically displaying the propagation history superimposed as a pathway on a chart showing a relationship among at least some of: the sender and the one or more recipients,
    wherein the chart includes a plurality of nodes, each of which nodes represents a single person selected from the group consisting of: the sender and the one or more recipients, and
    wherein the relationship includes a hierarchical relationship among at least some of: the sender and the one or more recipients, and wherein displaying comprises displaying the propagation history superimposed as the pathway on the chart showing the hierarchical relationship.

2. A method according to claim 1, wherein processing the data set comprises analyzing transmission information embedded in text of the e-mail.

3. A method according to claim 1, wherein processing the data set comprises analyzing transmission information not contained in text of the e-mail.

4. A method according to claim 1, wherein displaying the propagation history comprises designating a first visual symbol to represent transmission of the e-mail to a primary recipient, and designating a second visual symbol different from the first visual symbol to represent transmission of the e-mail to a secondary recipient.

5. A method according to claim 1, wherein displaying the propagation history comprises designating a first visual symbol to represent the sender and designating at least one visual symbol different from the first visual symbol to represent the one or more recipients.

6. A method according to claim 5, wherein displaying the propagation history comprises designating a first color for the first visual symbol and designating a second color, different from the first color, for the at least one visual symbol.

7. A method according to claim 1, wherein graphically displaying the propagation history comprises graphically displaying the steps in the history in an animation mode.

8. A method according to claim 1, wherein graphically displaying the propagation history comprises:
    displaying a representation of the sender and at least one of the recipients; and
    displaying a graphical representation of movement of the e-mail from the sender to the at least one of the recipients.

9. A method according to claim 8, wherein displaying the graphical representation of movement comprises displaying an arrow.

10. A method according to claim 1, wherein processing the data set comprises determining two or more steps in the propagation history of the e-mail, the transmission data including for each step in the propagation history identifiers of a sender and one or more recipients of a respective portion of the piece of e-mail, wherein the method comprises:

receiving from a user a designation of an electronic mail correspondent;

finding at least one identifier in the transmission data corresponding to the designated correspondent; and displaying part of the piece of e-mail responsive to finding the at least one identifier.

11. A method according to claim 10, wherein displaying part of the piece of e-mail comprises displaying e-mail content sent by the correspondent.

12. A method according to claim 10, wherein displaying part of the piece of e-mail comprises displaying e-mail content sent to the correspondent.

13. A method according to claim 10, wherein the chart includes a chart of a hierarchy, wherein displaying comprises displaying the propagation history superimposed as the pathway on the hierarchy chart, and comprising:

determining a location of the correspondent in the hierarchy; and identifying for the user the location of the correspondent in the hierarchy chart.

14. A method according to claim 1, wherein the relationship includes a geographical relationship among at least some of: the sender and the one or more recipients, and wherein displaying comprises displaying the propagation history superimposed as the pathway on the chart showing the geographical relationship.

15. A method according to claim 1, wherein the relationship includes a hierarchical and geographical relationship among at least some of: the sender and the one or more recipients, and wherein displaying comprises displaying the propagation history superimposed as the pathway on the chart showing the hierarchical and geographical relationship.

16. A method according to claim 1, wherein the hierarchical relationship includes a reporting relationship among at least some of: the sender and the one or more recipients, and wherein displaying comprises displaying the propagation history superimposed as the pathway on the chart showing the reporting relationship.

17. Apparatus for providing information regarding a piece of electronic mail (e-mail), comprising:

a processor, configured to process a data set containing transmission data associated with the e-mail so as to determine one or more steps in a propagation history of the e-mail, the transmission data including identifiers of a sender of the e-mail and of one or more recipients of at least a portion of the e-mail; and a display, configured to graphically display the propagation history superimposed as a pathway on a chart showing a relationship among at least some of: the sender and the one or more recipients, wherein the chart includes a plurality of nodes, each of which nodes represents a single person selected from the group consisting of: the sender and the one or more recipients, and wherein the relationship includes a hierarchical relationship among at least some of: the sender and the one or more recipients, and wherein the processor is configured to drive the displal to display the propagation history superimposed as the pathway on the chart showing the hierarchical relationship.

18. Apparatus according to claim 17, wherein the processor is configured to analyze transmission information embedded in text of the e-mail.

19. Apparatus according to claim 17, wherein the processor is configured to analyze transmission information not contained in text of the e-mail.

20. Apparatus according to claim 17, wherein the processor is configured to designate a first visual symbol to represent transmission of the e-mail to a primary recipient, and to designate a second visual symbol different from the first visual symbol to represent transmission of the e-mail to a secondary recipient.

21. Apparatus according to claim 17, wherein the processor is configured to designate a first visual symbol to represent the sender, and to designate at least one visual symbol different from the first visual symbol to represent the one or more recipients.

22. Apparatus according to claim 21, wherein the processor is configured to designate a first color for the first visual symbol, and to designate a second color, different from the first color, for the at least one visual symbol.

23. Apparatus according to claim 17, wherein the processor is configured to drive the display to graphically display the steps in the history in an animation mode.

24. Apparatus according to claim 17, wherein the processor is configured to drive the display to display a representation of the sender and at least one of the recipients, and to display a graphical representation of movement of the e-mail from the sender to the at least one of the recipients.

25. Apparatus according to claim 17, wherein the processor is configured to determine two or more steps in the propagation history of the e-mail, the transmission data including for each step in the propagation history identifiers of a sender and one or more recipients of a respective portion of the piece of e-mail, and wherein the processor is configured to:

receive from a user a designation of an electronic mail correspondent;

find at least one identifier in the transmission data corresponding to the designated correspondent; and drive the display to display part of the piece of e-mail responsive to finding the at least one identifier.

26. Apparatus according to claim 25, wherein the chart includes a chart of a hierarchy, wherein the display is configured to display the propagation history superimposed as the pathway on the hierarchy chart, and wherein the processor is configured to:

determine a location of the correspondent in the hierarchy; and drive the display to identify for the user the location of the correspondent in the hierarchy chart.

27. A computer program product for providing information regarding a piece of electronic mail (e-mail), the product comprising a computer-readable medium having program instructions embodied therein, which instructions, when read by a computer, cause the computer to:

process a data set containing transmission data associated with the e-mail so as to determine one or more steps in a propagation history of the e-mail, the transmission data including identifiers of a sender of the e-mail and of one or more recipients of at least a portion of the e-mail; and graphically display the propagation history superimposed as a pathway on a chart showing a relationship among at least some of: the sender and the one or more recipients, wherein the chart includes a plurality of nodes, each of which nodes represents a single person selected from the group consisting of: the sender and the one or more recipients, and wherein the relationship includes a hierarchical relationship among at least some of: the sender and the one or more recipients, and wherein the instructions, when read by the computer, cause the computer to display the propagation history superimposed as the pathway on the chart showing the hierarchical relationship.

28. A computer program product according to claim 27, wherein the instructions, when read by the computer, cause the computer to analyze transmission information embedded in text of the e-mail.

29. A computer program product according to claim 27, wherein the instructions, when read by the computer, cause the computer to analyze transmission information not contained in text of the e-mail.

30. A computer program product according to claim 27, wherein the instructions, when read by the computer, cause the computer to designate a first visual symbol to represent transmission of the e-mail to a primary recipient, and to designate a second visual symbol different from the first visual symbol to represent transmission of the e-mail to a secondary recipient.

31. A computer program product according to claim 27, wherein the instructions, when read by the computer, cause the computer to designate a first visual symbol to represent the sender and designate at least one visual symbol different from the first visual symbol to represent the one or more recipients.

32. A computer program product according to claim 31, wherein the instructions, when read by the computer, cause the computer to designate a first color for the first visual symbol and designate a second color, different from the first color, for the at least one visual symbol.

33. A computer program product according to claim 27, wherein the instructions, when read by the computer, cause the computer to graphically display the steps in the history in an animation mode.

34. A computer program product according to claim 27, wherein the instructions, when read by the computer, cause the computer to:
    display a representation of the sender and at least one of the recipients; and
    display a graphical representation of movement of the e-mail from the sender to the at least one of the recipients.

35. A computer program product according to claim 34, wherein the instructions, when read by the computer, cause the computer to display an arrow to represent the movement.

36. A computer program product according to claim 27, wherein the instructions, when read by the computer, cause the computer to determine two or more steps in the propagation history of the e-mail, the transmission data including for each step in the propagation history identifiers of a sender and one or more recipients of a respective portion of the piece of e-mail, and wherein the instructions, when read by the computer, cause the computer to:
    receive from a user a designation of an electronic mail correspondent;
    find at least one identifier in the transmission data corresponding to the designated correspondent; and
    display part of the piece of e-mail responsive to finding the at least one identifier.

37. A computer program product according to claim 36, wherein the instructions, when read by the computer, cause the computer to display e-mail content sent by the correspondent.

38. A computer program product according to claim 36, wherein the instructions, when read by the computer, cause the computer to display e-mail content sent to the correspondent.

39. A computer program product according to claim 36, wherein the chart includes a chart of a hierarchy, and wherein the instructions, when read by the computer, cause the computer to:
    display the propagation history superimposed as the pathway on the hierarchy chart;
    determine a location of the correspondent in the hierarchy; and
    identify for the user the location of the correspondent in the hierarchy chart.

40. A computer program product according to claim 27, wherein the relationship includes a geographical relationship among at least some of: the sender and the one or more recipients, and wherein the instructions, when read by the computer, cause the computer to display the propagation history superimposed as the pathway on the chart showing the geographic relationship.

41. A computer program product according to claim 27, wherein the relationship includes a hierarchical and geographical relationship among at least some of: the sender and the one or more recipients, and wherein the instructions, when read by the computer, cause the computer to display the propagation history superimposed as the pathway on the chart showing the hierarchical and geographic relationship.

42. A computer program product according to claim 27, wherein the hierarchical relationship includes a reporting relationship among at least some of: the sender and the one or more recipients, and wherein the instructions, when read by the computer, cause the computer to display the propagation history superimposed as the pathway on the chart showing the reporting relationship.

43. A method according to claim 13, wherein the hierarchy chart includes a tree, wherein determining the location of the correspondent comprises determining the location of the correspondent in the tree, wherein displaying the hierarchy chart comprises displaying the tree, and wherein identifying the location of the correspondent comprises identifying the location of the correspondent in the tree.

44. A method for providing information regarding a piece of electronic mail (e-mail), comprising:
    processing a data set containing transmission data associated with the e-mail so as to determine one or more steps in propagation history of the e-mail, the transmission data including identifiers of a sender of the e-mail and of one or more recipients of at least a portion of the e-mail; and
    graphically displaying he propagation history superimposed as a pathway on chart showing a relationship among at least some of: the sender and the one or more recipients,
    wherein the chart includes a plurality of nodes, each of which nodes represents a single person selected from the group consisting of: the sender and the one or more recipients,
    wherein processing the data set comprises determining two or more steps in the propagation history of the e-mail, the transmission data including for each step in the propagation history identifiers of a sender and one or more recipients of a respective portion of the piece of e-mail, wherein the method comprises:
    receiving from a user designation of an electronic mail correspondent;

finding at least one identifier in the transmission data corresponding to the designated correspondent; and displaying part of the piece of e-mail responsive to finding the at least one identifier, wherein the chart includes a chart of a hierarchy, where displaying comprises displaying the propagation history superimposed as the pathway on the hierarchy chart, and comprising:

determining a location of the correspondent in the hierarchy; and identifying for the user the location of the correspondent in the hierarchy chart, wherein the hierarchy includes a hierarchy of an organization, wherein determining the location of the correspondent comprises determining the location of the correspondent in the hierarchy of the organization, wherein displaying the hierarchy chart comprises displaying the hierarchy chart of the organization, and wherein identifying the location of the correspondent comprises determining the location of the correspondent in the hierarchy chart of the organization.

45. A method according to claim 1, wherein the chart shows a hierarchy of an organization of persons, and wherein the hierarchical relationship includes an organizational hierarchical relationship among at least some of: the sender and the one or more recipients, and wherein displaying comprises displaying the propagation history superimposed as the pathway on the chart showing the organizational hierarchical relationship.

46. A method according to claim 1, wherein the chart showing the hierarchical relationship includes a tree, and wherein displaying the propagation history comprises displaying the propagation history superimposed as the pathway on the tree.

47. Apparatus according to claim 26, wherein the hierarchy chart includes a tree, and wherein the processor is configured to:

determine a location of the correspondent in the tree;

drive the display to display the tree; and drive the display to identify for the user the location of the correspondent in the tree.

48. Apparatus according to claim 26, wherein the hierarchy includes a hierarchy of an organization, and wherein the processor is configured to:

determine a location of the correspondent in the hierarchy of the organization;

drive the display to display the hierarchy chart of the organization; and drive the display to identify for the user the location of the correspondent in the hierarchy chart of the organization.

49. Apparatus according to claim 17, wherein the chart shows a hierarchy of an organization of persons, and wherein the hierarchical relationship includes an organizational hierarchical relationship among at least some of: the sender and the one or more recipients, and wherein the processor is configured to drive the display to display the propagation history superimposed as the pathway on the chart showing the organizational hierarchical relationship.

50. Apparatus according to claim 17, wherein the processor is configured to drive the display to display the hierarchical relationship as a tree, and the propagation history superimposed as the pathway on the tree.

51. A computer program product according to claim 39, wherein the hierarchy chart includes a tree, and wherein the instructions, when read by the computer, cause the computer to:

determine the location of the correspondent in the tree;

display the tree; and identify the location of the correspondent in the tree.

52. A computer program according to claim 39, wherein the hierarchy includes a hierarchy of an organization, and wherein the instructions, when read by the computer, cause the computer to:

determine the location of the correspondent in the hierarchy of the organization;

display the hierarchy chart of the organization; and identify the location of the correspondent in the hierarchy chart of the organization.

53. A computer program according to claim 27, wherein the chart shows a hierarchy of an organization of persons, and wherein the hierarchical relationship includes an organizational hierarchical relationship among at least some of: the sender and the one or more recipients, and wherein the instructions, when read by the computer, cause the computer to display the propagation history superimposed as the pathway on the chart showing the organizational hierarchical relationship.

54. A computer program according to claim 27, wherein the chart showing the hierarchical relationship includes a tree, and wherein the instructions, when read by the computer, cause the computer to display the propagation history superimposed as the pathway on the tree.

* * * * *